(12) United States Patent
Aggarwal et al.

(10) Patent No.: US 12,182,955 B2
(45) Date of Patent: Dec. 31, 2024

(54) STYLIZED MOTION EFFECTS

(71) Applicant: ADOBE INC., San Jose, CA (US)

(72) Inventors: Pranav Vineet Aggarwal, Santa Clara, CA (US); Alvin Ghouas, Berkeley, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 299 days.

(21) Appl. No.: 17/814,940

(22) Filed: Jul. 26, 2022

(65) Prior Publication Data

US 2024/0037881 A1   Feb. 1, 2024

(51) Int. Cl.
*G06T 5/50* (2006.01)
*G06T 5/77* (2024.01)
*G06T 7/11* (2017.01)
*G06T 7/194* (2017.01)
*G06T 19/20* (2011.01)

(52) U.S. Cl.
CPC ............... *G06T 19/20* (2013.01); *G06T 5/50* (2013.01); *G06T 5/77* (2024.01); *G06T 7/11* (2017.01); *G06T 7/194* (2017.01); *G06T 2200/24* (2013.01); *G06T 2207/20021* (2013.01); *G06T 2207/20084* (2013.01); *G06T 2207/20092* (2013.01); *G06T 2207/20224* (2013.01); *G06T 2210/62* (2013.01); *G06T 2219/2004* (2013.01); *G06T 2219/2024* (2013.01)

(58) Field of Classification Search
CPC .... G06K 16/7847; G06Q 50/01; H04L 63/08; G06F 16/9577; G06F 3/013; G06T 17/10; G06T 19/006; G06T 2219/2004; G06N 3/0454; G06V 10/145; B42D 25/351; B42D 25/378; B32B 3/08
See application file for complete search history.

(56) References Cited

U.S. PATENT DOCUMENTS

2021/0319062 A1* 10/2021 Long .................... G06V 20/48
2022/0130104 A1*  4/2022 Serry ................... G06V 40/161

OTHER PUBLICATIONS

1He, et al., "Mask R-CNN", In Proceedings of the IEEE International Conference on Computer Vision, 2017, pp. 2961-2969.
2Advancing the state of the art in computer vision with self-supervised Transformers and 10x more efficient training, found on the internet at: https://ai.facebook.com/blog/dino-paws-computer-vision-with-self-supervised-transformers-and-10x-more-efficient-training/.

(Continued)

*Primary Examiner* — Phuoc H Doan
(74) *Attorney, Agent, or Firm* — F. CHAU & ASSOCIATES, LLC

(57) ABSTRACT

Systems and methods for image processing are described. Embodiments of the present disclosure receive a first image depicting a scene and a second image that includes a style; segment the first image to obtain a first segment and a second segment, wherein the first segment has a shape of an object in the scene; apply a style transfer network to the first segment and the second image to obtain a first image part, wherein the first image part has the shape of the object and the style from the second image; combine the first image part with a second image part corresponding to the second segment to obtain a combined image; and apply a lenticular effect to the combined image to obtain an output image.

20 Claims, 14 Drawing Sheets

(56) References Cited

OTHER PUBLICATIONS

3Detectron2, found on the internet at: https://github.com/facebookresearch/detectron2.
4Cheng, et al., "CascadePSP: Toward Class-Agnostic and Very High-Resolution Segmentation via Global and Local Refinement", In Proceedings of the IEEE/CVF Conference on Computer Vision and Pattern Recognition, 2020, pp. 8890-8899.
5LaMa: Resolution-robust Large Mask Inpainting with Fourier Convolutions, found on the internet at: https://github.com/saic-mdal/lama.
6Luo, et al., "Consistent Arbitrary Style Transfer", arXiv preprint arXiv:2201.02233v1 [cs.CV] Jan. 6, 2022, 10 pages.
7Li, et al., "Universal Style Transfer via Feature Transforms", Advances in neural information processing systems, arXiv preprint arXiv:1705.08086v2 [cs.CV] Nov. 17, 2017, 11 pages.
83D Photography using Context-aware Layered Depth Inpainting, found on the internet at: https://github.com/vt-vl-lab/3d-photo-inpainting.
9Shih, et al., "3D Photography using Context-aware Layered Depth Inpainting", In Proceedings of the IEEE/CVF Conference on Computer Vision and Pattern Recognition, 2020, pp. 8028-8038.

\* cited by examiner

STYLIZED MOTION EFFECTS

BACKGROUND

The following relates generally to digital image processing. Digital image processing refers to the use of a computer to process or edit a digital image using an algorithm or a processing network. Image processing software is commonly used for image editing, robot navigation, etc. Image segmentation is an example of an image processing task that identifies and labels objects within an image. In some cases, image segmentation enables computers to interpret visual information similar to how humans interpret visual information. Image processing systems can label images in a dataset based on detected objects in a process known as object detection. Object detection can be combined with other computer vision tasks such as semantic segmentation and instance segmentation.

Recently, deep learning techniques have been used for image segmentation and style transfer. However, deep learning-based models are limited to output 2D stylized images that are static in nature. Therefore, there is a need in the art for improved image editing systems that can add motion effects to stylized images.

SUMMARY

The present disclosure describes systems and methods for image processing. Embodiments of the present disclosure include an image processing apparatus configured to receive an input image and apply a style transfer and a lenticular effect to obtain an output image. In some cases, the image processing apparatus outputs a sequence of frames including the output image to create a motion effect. For example, the image processing apparatus can modify images with various styles applied to different parts of the image and then add a "lenticular effect", which can include one of a set of 3D motion effects. In some examples, the motion effect includes a zoom motion, a circular motion, a swing motion, or any combination thereof. In some embodiments, the image processing apparatus segments an input image and applies a style transfer network to different parts of the image prior to applying the lenticular effect.

A method, apparatus, and non-transitory computer readable medium for image processing are described. One or more embodiments of the method, apparatus, and non-transitory computer readable medium include receiving a first image depicting a scene and a second image that includes a style; segmenting the first image to obtain a first segment and a second segment, wherein the first segment has a shape of an object in the scene; applying a style transfer network to the first segment and the second image to obtain a first image part, wherein the first image part has the shape of the object and the style from the second image; combining the first image part with a second image part corresponding to the second segment to obtain a combined image; and applying a lenticular effect to the combined image to obtain an output image.

A method, apparatus, and non-transitory computer readable medium for image processing are described. One or more embodiments of the method, apparatus, and non-transitory computer readable medium include receiving a first image from a user; segmenting the first image to obtain a first segment and a second segment, wherein the first segment has a shape of an object in the first image; receiving a selection input from the user identifying the first segment; displaying a plurality of style images to the user; receiving a selection input identifying a second image from the plurality of style images; transferring a style from the second image to the first segment to obtain a first image part, wherein the first image part has the shape of the object in the first image and a style from the second image; combining the first image part with a second image part corresponding to the second segment to obtain a combined image; applying a lenticular effect to the combined image to obtain an output image; and displaying the output image to the user.

An apparatus and method for image processing are described. One or more embodiments of the apparatus and method include an image segmentation network configured to segment a first image to obtain a first segment and a second segment, wherein the first segment has a shape of an object in the first image; a style transfer network configured to generate a first image part based on the first segment and a second image, wherein the first image part has the shape of the object and the style from the second image; a composition component configured to combine the first image part with a second image part corresponding to the second segment to obtain a combined image; and a post-processing component configured to apply a lenticular effect to the combined image to obtain an output image.

DETAILED DESCRIPTION

Figure 1:
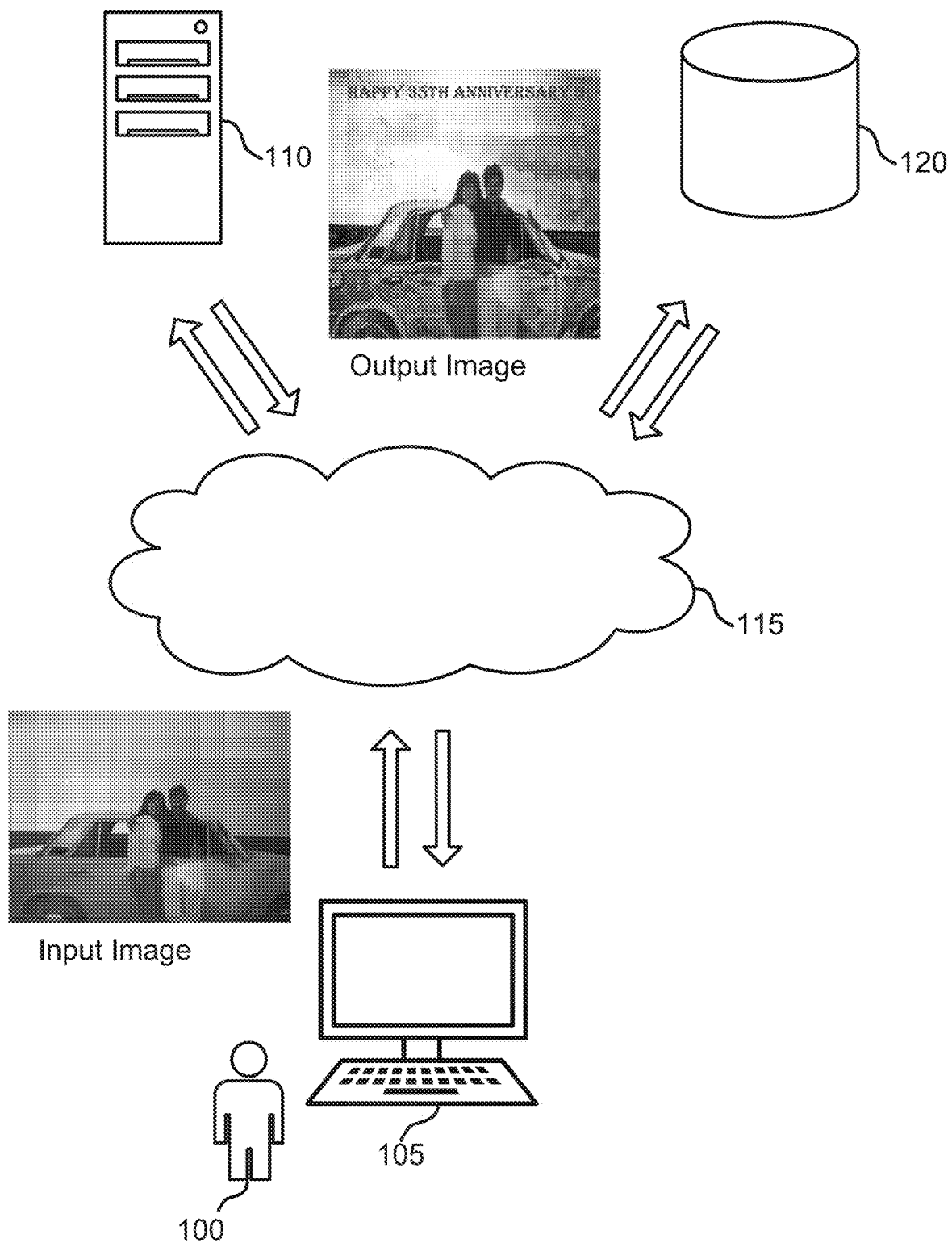
FIG. 1 shows an example of an image processing system according to aspects of the present disclosure.

The present disclosure describes systems and methods for image processing. Embodiments of the present disclosure include an image processing apparatus configured to receive an input image and apply style transfer and a lenticular effect to obtain an output image. In some cases, the image processing apparatus outputs a sequence of frames comprising the output image. The image processing apparatus can modify images with various styles applied to different parts of the image and then add a "lenticular effect", which can include one of a set of 3D motion effects. In some examples, the motion effect includes a zoom motion, a circular motion, a swing motion, or any combination thereof. In some embodiments, the image processing apparatus segments an input image and applies a style transfer network to different parts of the image prior to applying the lenticular effect.

Some image editing systems modify the style of an image using style transfer methods. These style transfer methods are applied to the entire image uniformly or to one or more objects of the image. Outputs from these systems are static (i.e., 2D stylized images) and the modified images are limited in terms of diversity, expression, and creativity compared to the extent of content and effects shown in videos. As a result, these images may not capture nor depict the action or intensity (e.g., mood, feelings) that a user associates with an image.

Embodiments of the present disclosure include an image processing apparatus configured to receive an image from a user and output a modified image that is stylized based on a selected style image, and also includes a lenticular effect. In some examples, the lenticular effect includes a motion effect such as a zoom motion, a circular motion, a swing motion, or any combination thereof.

In some embodiments, the image processing apparatus modifies images with various styles applied to different parts of the image and with a "lenticular effect", which can include one of several 3D motion effects. Some embodiments relate to segmenting the image and applying a style transfer network to different parts of the image prior to applying the lenticular effect. In some cases, style transfer is applied on the background and selected objects in the image where a selected object has a corresponding segmentation mask. This way, the foreground of the image (e.g., a person, a human face, etc.) is not stylized and the foreground is clear and identifiable. The foreground of the image, e.g., the person of the image, is displayed more prominently after 3D effects are generated.

According to at least one embodiment of the present disclosure, the image processing apparatus includes an image segmentation network, a style transfer network, a composition component, and a post-processing component that fuses style transfer with 3D photo inpainting to generate an output image (i.e., a stylized output with lenticular effect). In some examples, the output image is a virtual 3D lenticular. In some examples, the image processing apparatus generates an output video with a lenticular effect mentioned above, where the output image is one of the frames representing the output video.

In some embodiments, the style transfer network of the image processing apparatus focuses more on the background of the image such that a more personalized lenticular for the user is produced. That is, human faces are less distorted. The apparatus, systems, and methods described in the present disclosure can be used to generate virtual postcards and social media stories. Through the combination of style transfer and 3D photo inpainting, personal experience with images and the ability to visualize images are increased.

Embodiments of the present disclosure may be used in the context of image processing applications. For example, an image processing network based on the present disclosure may take an input image and efficiently generate a stylized output with a lenticular effect (e.g., stylized image or video) for subsequent user manipulation. Details regarding the architecture of an example image processing apparatus are provided with reference to FIGS. 1-3. Example applications, according to some embodiments, are provided with reference to FIGS. 4-5. Example processes for image processing are provided with reference to FIGS. 6-14.

Image Processing System

Figure 2:
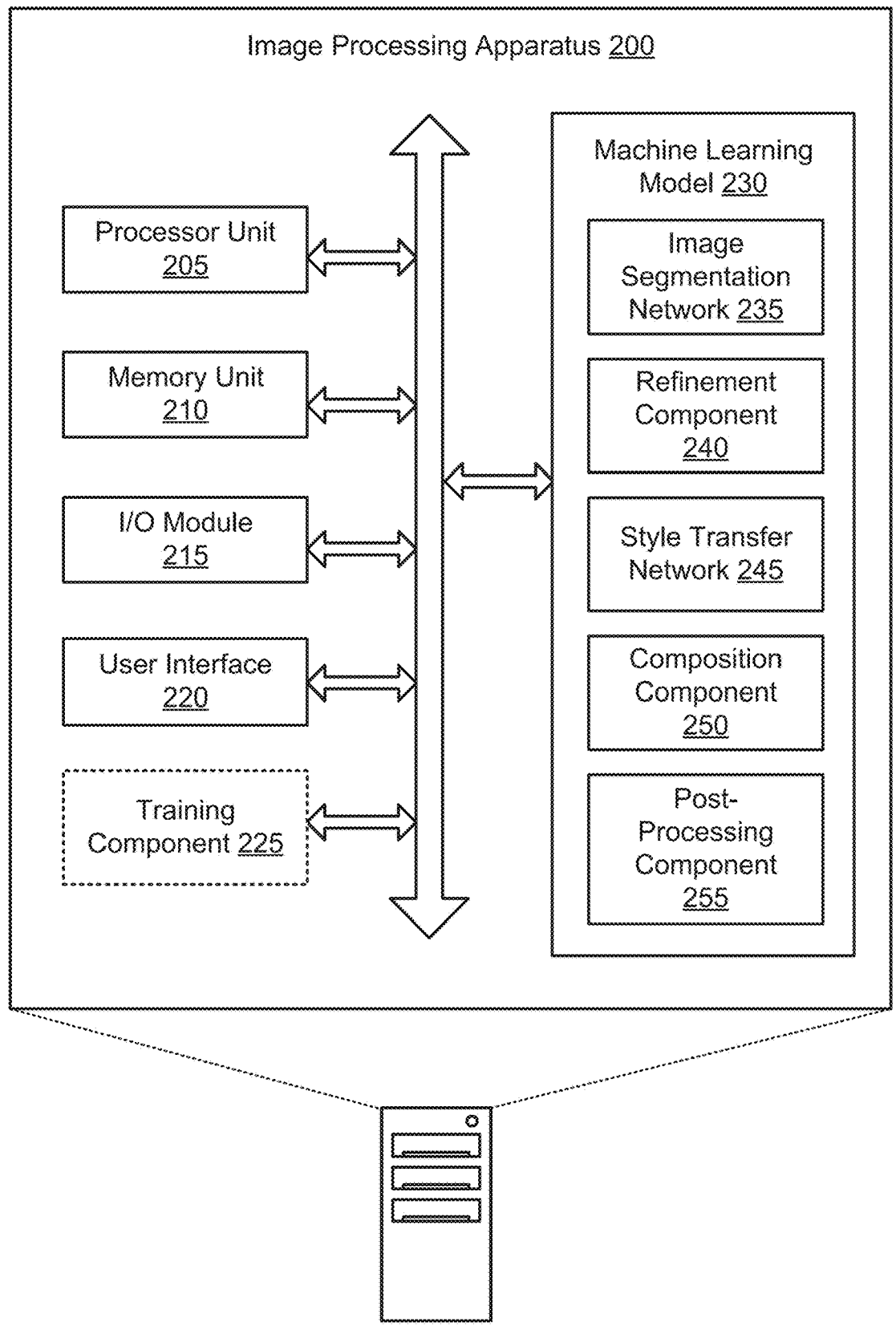
FIG. 2 shows an example of an image processing apparatus according to aspects of the present disclosure.
Figure 3:
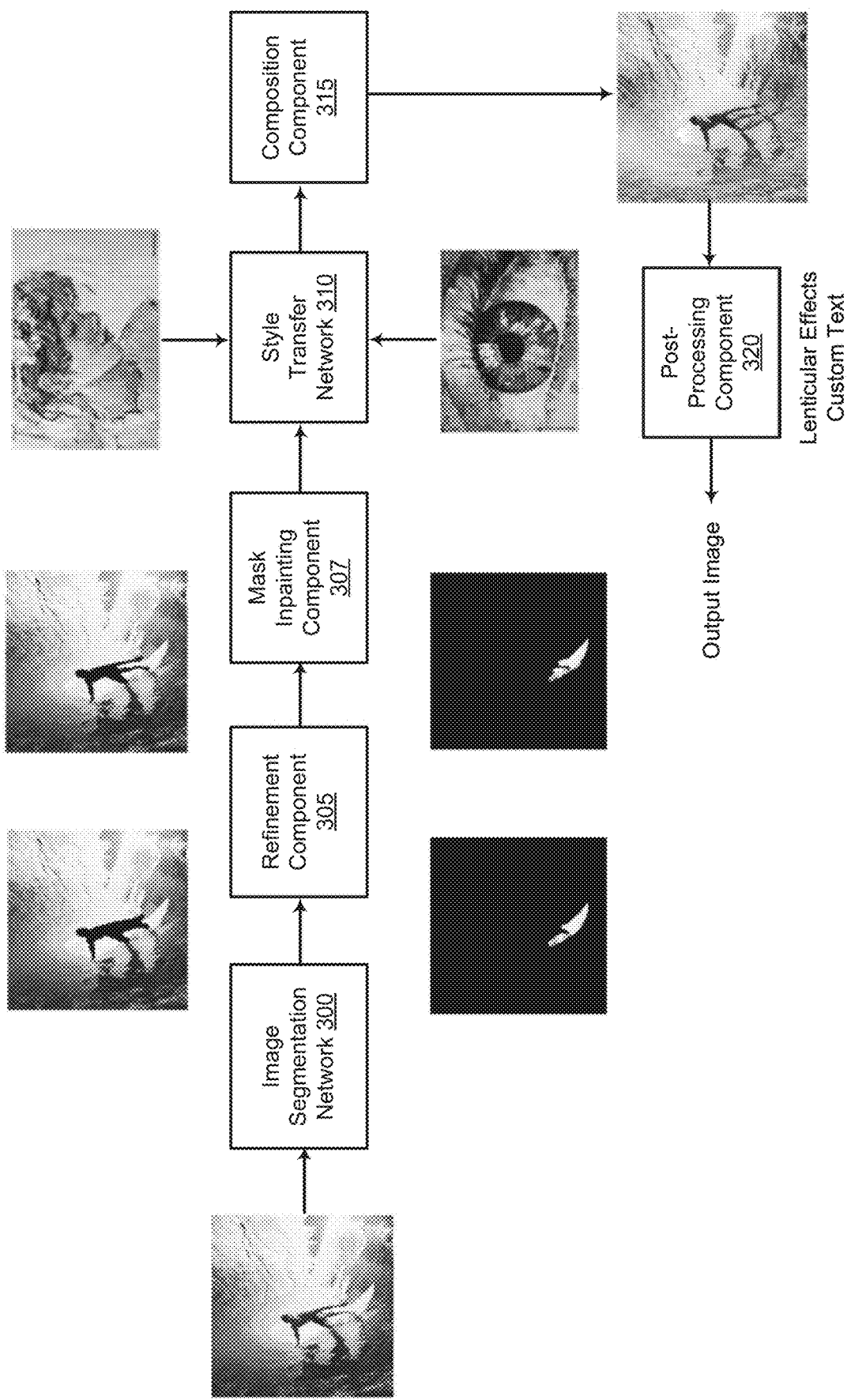
FIG. 3 shows an example of a machine learning model according to aspects of the present disclosure.

In FIGS. 1-3, an apparatus and method for image processing are described. One or more embodiments of the apparatus and method include an image segmentation network configured to segment a first image to obtain a first segment and a second segment, wherein the first segment has a shape of an object in the first image; a style transfer network configured to generate a first image part based on the first segment and a second image, wherein the first image part has the shape of the object and the style from the second image; a composition component configured to combine the first image part with a second image part corresponding to the second segment to obtain a combined image; and a post-processing component configured to apply a lenticular effect to the combined image to obtain an output image.

Some examples of the apparatus and method further include a user interface including an image upload element, a segment selection element, and a style selection element. Some examples of the apparatus and method further include a refinement component configured to refine a segmentation mask to obtain the first segment.

In some examples, the image segmentation network includes Mask R-CNN. Here, Mask R-CNN is a type of convolutional neural network (CNN). In some examples, the image segmentation network includes a foreground detector network. In some examples, the style transfer network includes a progressive attentional manifold alignment network.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 2.

As an example shown in FIG. 1, user 100 uploads an input image via user device 105. The input image is transmitted to image processing apparatus 110, e.g., via cloud 115. Image processing apparatus 110 segments the input image depicting a scene to obtain a first segment and a second segment, where the first segment has a shape of an object in the scene. The first segment depicts the background of the image that includes a couple standing next to a car. User 100 identifies the first segment (i.e., the background of the input image or an image part excluding the couple).

A user interface on user device 105 displays a set of style images to user 100. The user interface receives a selection input from user 100 identifying a style image from the set of style images. Image processing apparatus 110 transfers a style from the style image to the first segment to obtain a first image part. The first image part has a shape of an object in the input image and a style from the style image. A similar process is repeated to obtain a second image part. Image processing apparatus 110 combines the first image part with the second image part corresponding to the second segment to obtain a combined image. Image processing apparatus 110 then applies a lenticular effect (e.g., a motion effect) to the combined image to obtain an output image. The output image is returned to user 100 via cloud 115 and user device 105. In some examples, image processing apparatus 110 outputs a video, where the output image is a frame of the output video.

User device 105 may be a personal computer, laptop computer, mainframe computer, palmtop computer, personal assistant, mobile device, or any other suitable processing apparatus. In some examples, user device 105 includes software that incorporates an image processing application (e.g., an image editing application). In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Image processing apparatus 110 receives a first image depicting a scene and a second image that includes a style; segments the first image to obtain a first segment and a second segment, where the first segment has a shape of an object in the scene; applies a style transfer network to the first segment and the second image to obtain a first image part, where the first image part has the shape of the object and the style from the second image; combines the first image part with a second image part corresponding to the second segment to obtain a combined image; and applies a lenticular effect to the combined image to obtain an output image. Image processing apparatus 110 returns the output image or an output video (e.g., MP4 file) to user 100. The process of using image processing apparatus 110 is further described with reference to FIG. 4.

Image processing apparatus 110 includes a computer implemented network comprising an image segmentation network, a refinement component, a style transfer network, a composition component, and a post-processing component. Image processing apparatus 110 may also include a processor unit, a memory unit, an I/O module, user interface, and a training component. The training component is used to train a machine learning model (or an image processing network). Additionally, image processing apparatus 110 can communicate with database 120 via cloud 115. In some cases, the architecture of the image processing network is also referred to as a network or a network model. Further detail regarding the architecture of image processing apparatus 110 is provided with reference to FIGS. 2-3. Further detail regarding the operation of image processing apparatus 110 is provided with reference to FIGS. 4-14.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

FIG. 2 shows an example of an image processing apparatus 200 according to aspects of the present disclosure. The example shown includes image processing apparatus 200, processor unit 205, memory unit 210, I/O module 215, user interface 220, training component 225, and machine learning model 230. Image processing apparatus 200 is an example of, or includes aspects of, the corresponding element described with reference to FIG. 1. In one embodiment, machine learning model 230 includes image segmentation network 235, refinement component 240, style transfer network 245, composition component 250, and post-processing component 255.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. A communication interface is provided herein to enable a processing system coupled to a transceiver (e.g., a transmitter and/or a receiver). In some examples, the transceiver is configured to transmit (or send) and receive signals for a communications device via an antenna.

According to some embodiments, user interface 220 receives a first image depicting a scene and a second image that includes a style. In some examples, user interface 220 receives a third image including an additional style. In some examples, machine learning model 230 provides an image upload element in user interface 220, where the first image is received via the image upload element. In some examples, user interface 220 receives caption text from a user input. User interface 220 adds the caption text to the output image.

According to some embodiments, user interface 220 receives a first image from a user. In some examples, user interface 220 receives a selection input from the user identifying the first segment. User interface 220 displays a set of style images to the user. User interface 220 receives a selection input identifying a second image from the set of style images. User interface 220 displays the output image to the user. In some examples, user interface 220 receives an additional selection input identifying a third image from the set of style images. User interface 220 receives caption text from the user. According to some embodiments, user interface 220 includes an image upload element, a segment selection element, and a style selection element.

According to some embodiments of the present disclosure, image processing apparatus 200 includes a computer implemented artificial neural network (ANN) for image segmentation and style transfer. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image processing apparatus 200 includes a convolutional neural network (CNN) for object segmentation, style transfer, and mask refinement. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 225 is configured to train image segmentation network 235. Training component 225 may be used to train style transfer network 245. In some examples, training component 225 is part of another apparatus other than image processing apparatus 200. In some cases, training component 225 is optional (e.g., image segmentation network 235 and style transfer network 245 include pre-trained models).

According to some embodiments, image segmentation network 235 segments the first image to obtain a first segment and a second segment, where the first segment has a shape of an object in the scene. In some examples, image segmentation network 235 generates a segmentation mask corresponding to the object.

According to some embodiments, image segmentation network 235 segments the first image to obtain a first segment and a second segment, where the first segment has a shape of an object in the scene. In some examples, image segmentation network 235 identifies the first segment or the second segment as a foreground element. Image segmentation network 235 displays an indication of the foreground element to the user.

According to some embodiments, image segmentation network 235 is configured to segment a first image to obtain a first segment and a second segment, where the first segment has a shape of an object in the first image. In some examples, the image segmentation network 235 includes Mask R-CNN. In some examples, the image segmentation network 235 includes a foreground detector network. Image segmentation network 235 is an example of, or includes aspects of, the corresponding element described with reference to FIG. 3.

According to some embodiments, refinement component 240 refines the segmentation mask to obtain the first segment. Refinement component 240 is an example of, or includes aspects of, the corresponding element described with reference to FIG. 3.

According to some embodiments, style transfer network 245 is applied to the first segment and the second image to obtain a first image part, where the first image part has the shape of the object and the style from the second image. In some examples, style transfer network 245 is applied to the second segment and the third image to obtain the second image part, where the second image part includes the additional style. In some examples, style transfer network 245 performs a progressive attentional manifold alignment process on the first segment and the second image using the style transfer network 245, where the first image part is generated based on the progressive attentional manifold alignment process.

According to some embodiments, style transfer network 245 transfers a style from the second image to the first segment to obtain a first image part, where the first image part has a shape of an object in the first image and a style from the second image. In some examples, style transfer network 245 transfers an additional style from the third image to the second segment to obtain the second image part.

According to some embodiments, style transfer network 245 is configured to generate a first image part based on the first segment and a second image, wherein the first image part has the shape of the object and the style from the second image. In some examples, the style transfer network 245 includes a progressive attentional manifold alignment network. Style transfer network 245 is an example of, or includes aspects of, the corresponding element described with reference to FIG. 3.

According to some embodiments, composition component 250 combines the first image part with a second image part corresponding to the second segment to obtain a combined image. Composition component 250 is an example of, or includes aspects of, the corresponding element described with reference to FIG. 3.

According to some embodiments, post-processing component 255 applies a lenticular effect to the combined image to obtain an output image. In some examples, post-processing component 255 generates a depth map of the combined image. Post-processing component 255 generates a three-dimensional (3D) mesh based on the depth map. Post-processing component 255 generates a motion effect based on the 3D mesh, where the lenticular effect includes the motion effect. In some examples, the motion effect includes a zoom motion, a circular motion, a swing motion, or any combination thereof.

In some examples, post-processing component 255 generates a first transparency parameter for the first image and a second transparency parameter for the combined image. Post-processing component 255 generates one or more intermediate images by modifying the first transparency parameter and the second transparency parameter, where the output image includes the one or more intermediate images. Post-processing component 255 is an example of, or includes aspects of, the corresponding element described with reference to FIG. 3.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 3 shows an example of a machine learning model according to aspects of the present disclosure. The machine learning model and its components are shown in FIG. 3 and are described with reference to FIG. 2. The example shown includes image segmentation network 300, refinement component 305, mask inpainting component 307, style transfer network 310, composition component 315, and post-processing component 320.

As an example shown in FIG. 3, from left to right, image segmentation network 300 receives a first image depicting a scene. The first image depicts a man surfing on a surfboard. Image segmentation network 300 segments the first image to obtain a first segment and a second segment, where the first segment has a shape of an object in the first image. For example, the first segment is the background of the first image (i.e., the person in the image is considered the foreground in this example). The second segment indicates the surfboard object. Image segmentation network 300 is an example of, or includes aspects of, the corresponding element described with reference to FIG. 2.

Refinement component 305 is configured to refine a segmentation mask to obtain the first segment. Refinement component 305 refines a segmentation mask to obtain the second segment. Refinement component 305 is an example of, or includes aspects of, the corresponding element described with reference to FIG. 2.

Mask inpainting component 307 is configured to performed mask inpainting. That is, mask inpainting component 307 removes one or more objects from an image such that the one or more objects are not part of the style transfer. In some examples, the user chooses to exclude an object of the image from style transfer (i.e., not be part of the style transfer). Mask inpainting step is optional.

Style transfer network 310 is applied to the first segment and the second image to obtain a first image part. The first image part has the shape of the object and the style from the second image. In some examples, the second image depicts a face and includes a style. Additionally, style transfer network 310 is applied to the second segment and a third image to obtain a second image part. In some examples, the third image depicts an eye and includes a style. Style transfer network 310 is an example of, or includes aspects of, the corresponding element described with reference to FIG. 2.

Composition component 315 is configured to combine the first image part with the second image part corresponding to the second segment to obtain a combined image. Composition component 315 is an example of, or includes aspects of, the corresponding element described with reference to FIG. 2.

Post-processing component 320 applies a lenticular effect to the combined image to obtain an output image. Post-processing component 320 is an example of, or includes aspects of, the corresponding element described with reference to FIG. 2.

Image Editing

In FIGS. 4-14, a method, apparatus, and non-transitory computer readable medium for image processing are described. One or more embodiments of the method, apparatus, and non-transitory computer readable medium include receiving a first image depicting a scene and a second image that includes a style; segmenting the first image to obtain a first segment and a second segment, wherein the first segment has a shape of an object in the scene; applying a style transfer network to the first segment and the second image to obtain a first image part, wherein the first image part has the shape of the object and the style from the second image; combining the first image part with a second image part corresponding to the second segment to obtain a combined image; and applying a lenticular effect to the combined image to obtain an output image.

Some examples of the method, apparatus, and non-transitory computer readable medium further include receiving a third image including an additional style. Some examples further include applying the style transfer network to the second segment and the third image to obtain the second image part, wherein the second image part includes the additional style.

Some examples of the method, apparatus, and non-transitory computer readable medium further include removing at least a portion of the first image based on the second segment. Some examples further include performing inpainting on the second segment to obtain the second image part. Some examples of the method, apparatus, and non-transitory computer readable medium further include generating a segmentation mask corresponding to the object. Some examples further include refining the segmentation mask to obtain the first segment.

Some examples of the method, apparatus, and non-transitory computer readable medium further include performing a progressive attentional manifold alignment process on the first segment and the second image using the style transfer network, wherein the first image part is generated based on the progressive attentional manifold alignment process. Some examples of the method, apparatus, and non-transitory computer readable medium further include providing an image upload element in a user interface, wherein the first image is received via the image upload element.

Some examples of the method, apparatus, and non-transitory computer readable medium further include receiving caption text from a user input. Some examples further include adding the caption text to the output image.

A method, apparatus, and non-transitory computer readable medium for image processing are described. One or more embodiments of the method, apparatus, and non-transitory computer readable medium include receiving a first image from a user; segmenting the first image to obtain a first segment and a second segment, wherein the first segment has a shape of an object in the first image; receiving a selection input from the user identifying the first segment; displaying a plurality of style images to the user; receiving a selection input identifying a second image from the plurality of style images; transferring a style from the second image to the first segment to obtain a first image part, wherein the first image part has the shape of the object in the first image and a style from the second image; combining the first image part with a second image part corresponding to the second segment to obtain a combined image; applying a lenticular effect to the combined image to obtain an output image; and displaying the output image to the user.

Some examples of the method, apparatus, and non-transitory computer readable medium further include identifying the first segment or the second segment as a foreground element. Some examples further include displaying an indication of the foreground element to the user. Some examples of the method, apparatus, and non-transitory computer readable medium further include receiving an additional selection input identifying a third image from the plurality of style images. Some examples further include transferring an additional style from the third image to the second segment to obtain the second image part.

Some examples of the method, apparatus, and non-transitory computer readable medium further include receiving caption text from the user. Some examples further include adding the caption text to the output image.

Figure 4:
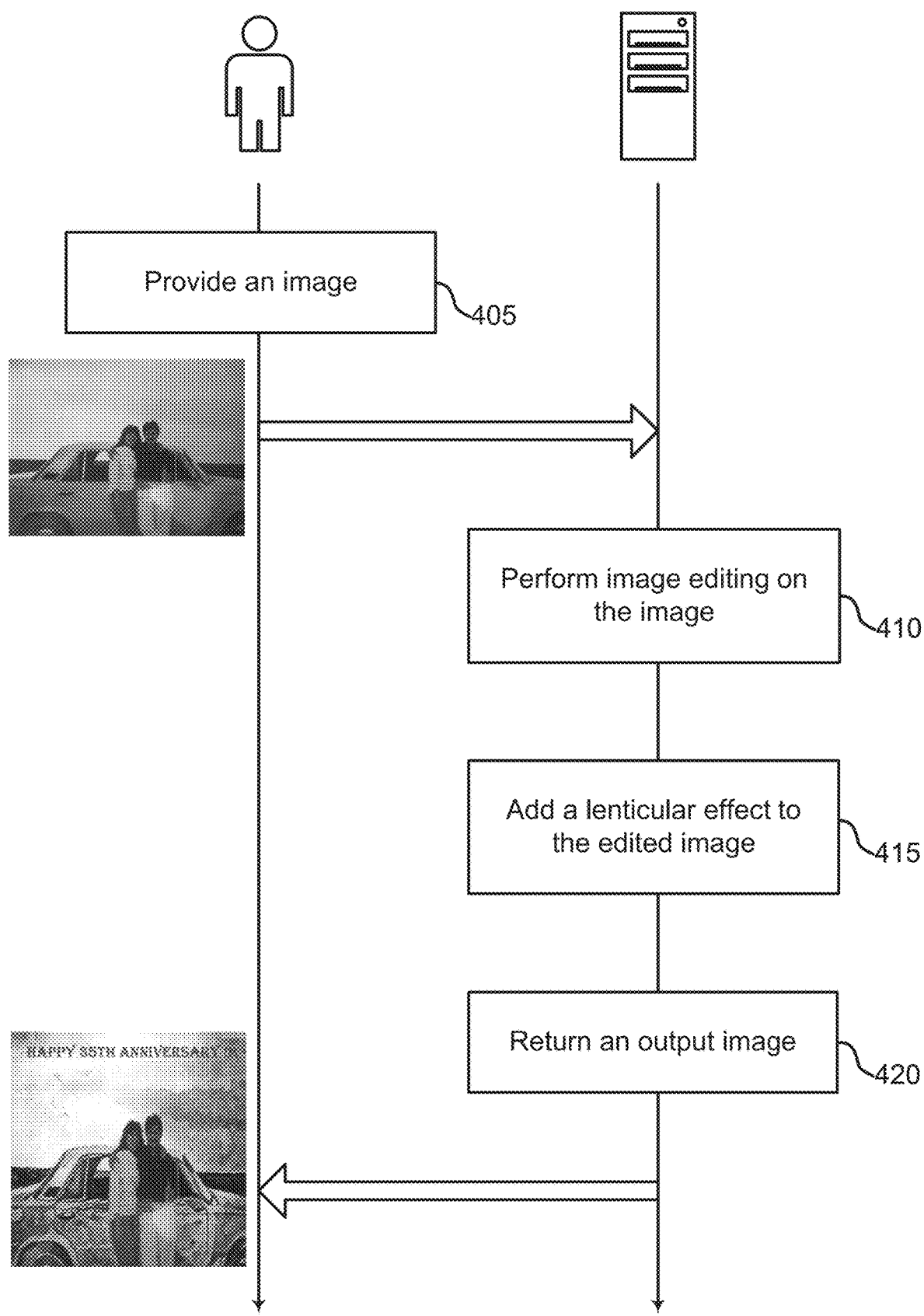
FIG. 4 shows an example of image editing according to aspects of the present disclosure.

FIG. 4 shows an example of image editing according to aspects of the present disclosure. In some examples, these operations are performed by a system including a processor executing a set of codes to control functional elements of an apparatus, e.g., image processing apparatus 200 as shown in FIG. 2. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the user provides an image. In some cases, the operations of this step refer to, or may be performed by, a user as described with reference to FIG. 1. In some examples, the user uploads the image via an image upload element of a user interface. The image depicts a couple standing next to a car.

At operation 410, the system performs image editing on the image to obtain an edited image. In some cases, the operations of this step refer to, or may be performed by, an image processing apparatus as described with reference to FIGS. 1 and 2. In some examples, the image processing apparatus identifies a style image from a set of style images based on user preference. The image processing apparatus generates a stylized image. The stylized image has the shape of an object of the image and the style from the style image.

At operation 415, the system adds a lenticular effect to the edited image. In some cases, the operations of this step refer to, or may be performed by, an image processing apparatus as described with reference to FIGS. 1 and 2. In some examples, the lenticular effect includes a motion effect. The motion effect includes a zoom motion, a circular motion, a swing motion, or any combination thereof. In some examples, "lenticular effect" may be referred to the illusion of movement from background to foreground to create the effect of "leaping out" or "jumping back". A lenticular zoom animation can include one or more objects, or a full image. The lenticular effect is used to highlight certain objects in an image such as faces, products, logos, or messages. In some examples, users can modify image attributes to show a darker color in the background and warmer, lighter tones for the element in motion to produce desired zoom effect.

At operation 420, the system returns an output image. In some cases, the operations of this step refer to, or may be performed by, an image processing apparatus as described with reference to FIGS. 1 and 2. In the above example, the background is stylized while the foreground persons (i.e., the man and the woman) are not changed. The car and sky may have different color effects, shadings, patterns, or a combination thereof. The image processing apparatus adds text information on the output image that states "Happy 35$^{th}$ Anniversary".

Figure 5:
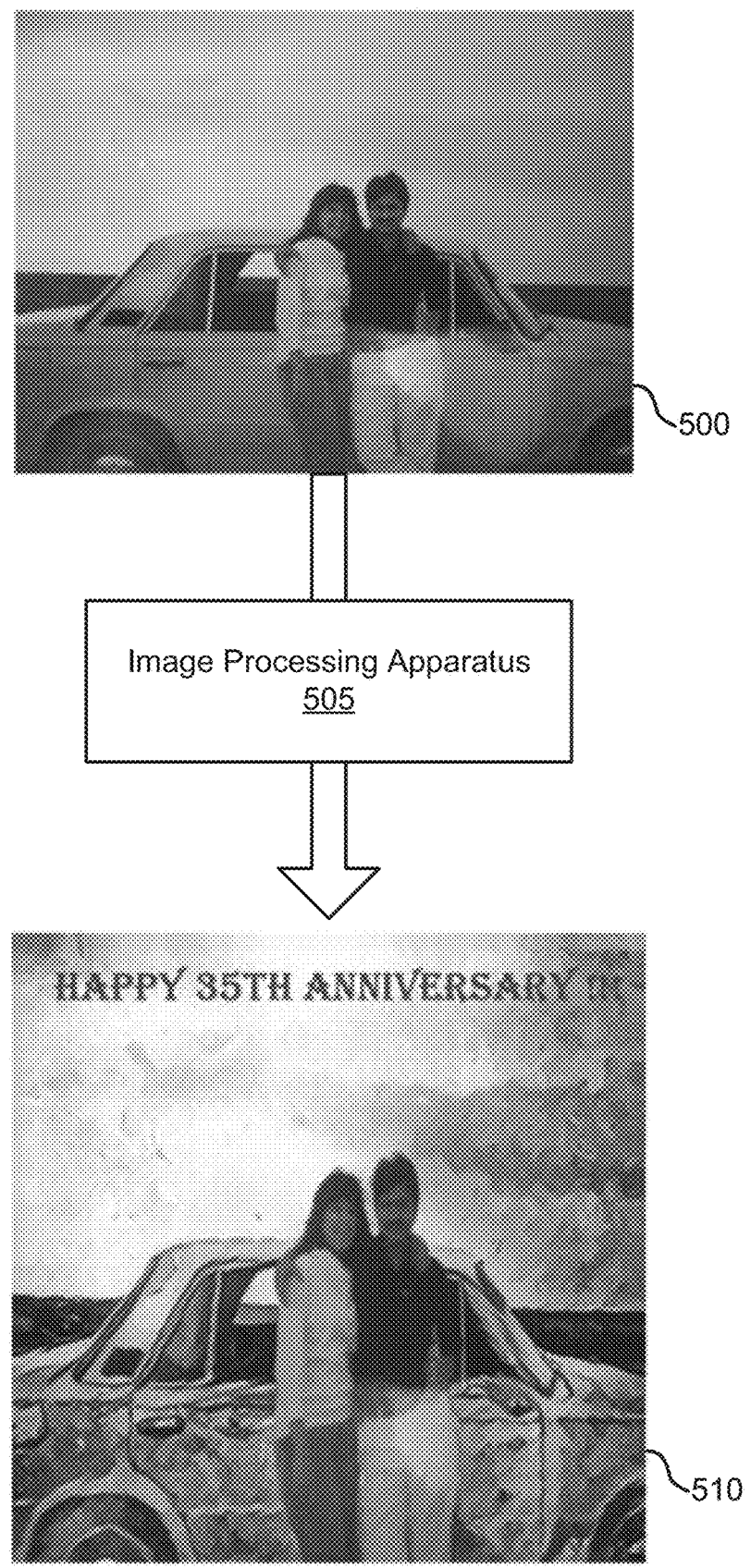
FIG. 5 shows an example of image editing application according to aspects of the present disclosure.

FIG. 5 shows an example of an image editing application according to aspects of the present disclosure. The example shown includes image 500, image processing apparatus 505, and output image 510. As an example shown in FIG. 5, image 500 is an old photo depicting a couple standing next to a car. Image processing apparatus 505 generates output image 510 based on image 500. In some examples, output image 510 is a frame of an output video (e.g., MP4 file). That is, image processing apparatus 505 can apply video effects and generate a video based on image 500.

The background of output image 510 incorporates a style from one or more style images. That is, the background is stylized while the foreground persons are not changed. The car and sky may have different color effects, shadings, patterns, or a combination thereof. Additionally, image processing apparatus 505 adds a lenticular effect (e.g., a motion effect) to image 500. The motion effect includes, but not limited to, a zoom motion, a circular motion, a swing motion, or any combination thereof. The image processing apparatus adds text information on the output image that states "Happy 35$^{th}$ Anniversary".

Image 500 is an example of, or includes aspects of, the corresponding element described with reference to FIGS. 8, 9, 11, and 12. Output image 510 is an example of, or includes aspects of, the corresponding element described with reference to FIGS. 8 and 14. Image processing apparatus 505 is an example of, or includes aspects of, the corresponding element described with reference to FIGS. 1 and 2.

Figure 6:
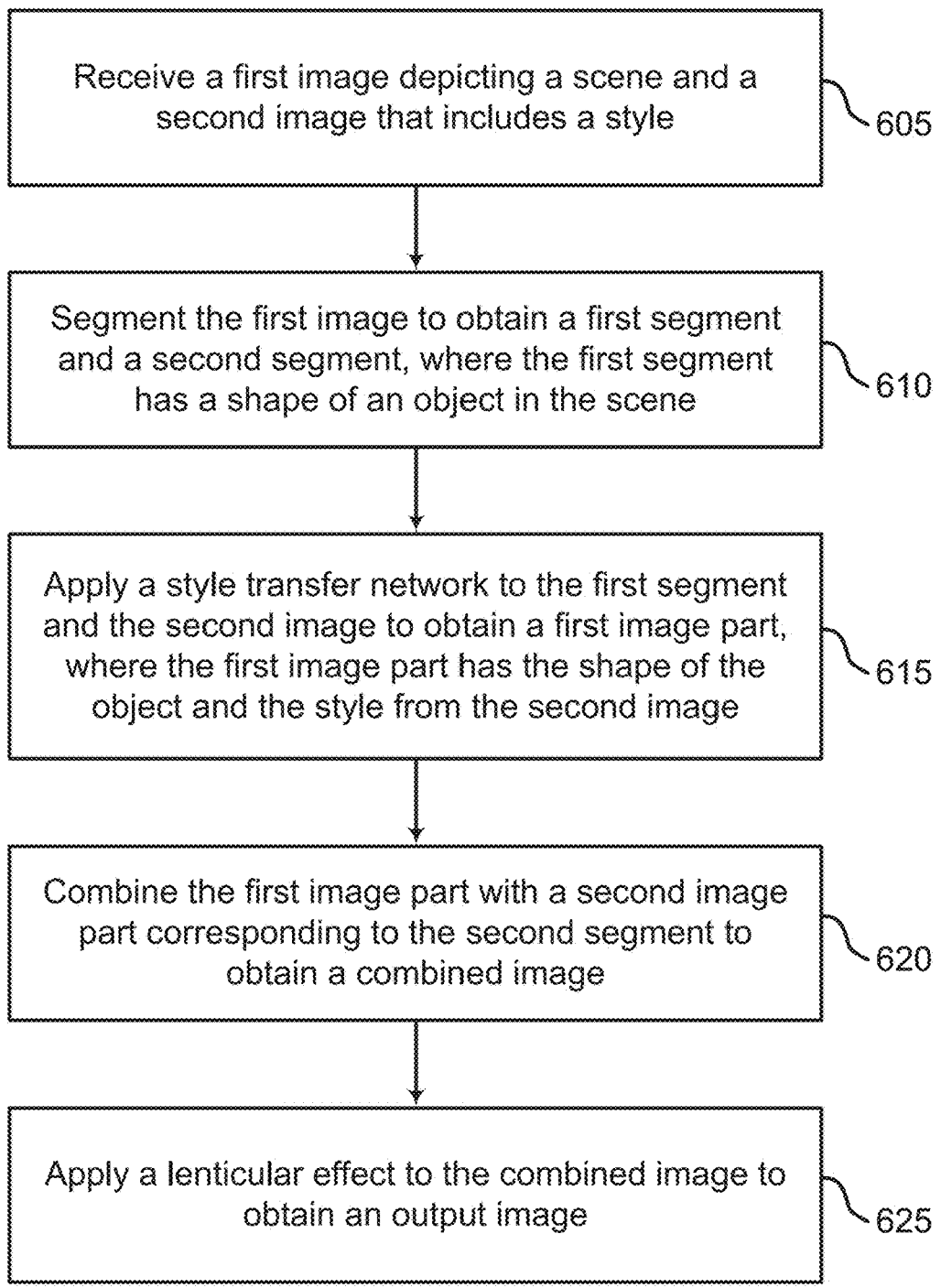
FIG. 6 shows an example of a method for image processing to create stylized three-dimensional (3D) images according to aspects of the present disclosure.

FIG. 6 shows an example of a method for image processing to create stylized 3D images according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system receives a first image depicting a scene and a second image that includes a style. In some cases, the operations of this step refer to, or may be performed by, a user interface as described with reference to FIG. 2. In some examples, the system receives the first image from a user, e.g., via image upload element of a user interface. For example, the first image depicts a scene including a couple standing next to a car as shown in FIG. 5.

At operation 610, the system segments the first image to obtain a first segment and a second segment, where the first segment has a shape of an object in the scene. In some cases, the operations of this step refer to, or may be performed by, an image segmentation network as described with reference to FIGS. 2 and 3. According to an embodiment, a refinement component is configured to refine a segmentation mask to obtain the first segment. In some examples, the first segment may depict the background of the first image. The second segment may depict an object of the first image (e.g., a car). In some examples, the class of persons is identified as the foreground, i.e., the background does not include the person.

At operation 615, the system applies a style transfer network to the first segment and the second image to obtain a first image part, where the first image part has the shape of the object and the style from the second image. In some cases, the operations of this step refer to, or may be performed by, a style transfer network as described with reference to FIGS. 2 and 3. Detail regarding style transfer will be described with reference to FIG. 7.

At operation 620, the system combines the first image part with a second image part corresponding to the second segment to obtain a combined image. In some cases, the operations of this step refer to, or may be performed by, a composition component as described with reference to FIGS. 2 and 3. In some examples, the second image part has the shape of an additional object and the style from an additional style image. That is, styles from different style images are transferred to different image parts of a same image.

At operation 625, the system applies a lenticular effect to the combined image to obtain an output image. In some cases, the operations of this step refer to, or may be performed by, a post-processing component as described with reference to FIGS. 2 and 3. Detail regarding applying a lenticular effect to the combined image will be described in FIGS. 8 and 9.

Some examples of the method, apparatus, and non-transitory computer readable medium further include generating a depth map of the combined image. Some examples further include generating a three-dimensional (3D) mesh based on the depth map. Some examples further include generating a motion effect based on the 3D mesh, wherein the lenticular effect comprises the motion effect. In some examples, the motion effect comprises a zoom motion, a circular motion, a swing motion, or any combination thereof.

Some examples of the method, apparatus, and non-transitory computer readable medium further include generating a first transparency parameter for the first image and a second transparency parameter for the combined image. Some examples further include generating one or more intermediate images by modifying the first transparency parameter and the second transparency parameter, wherein the output image includes the one or more intermediate images.

Figure 7:
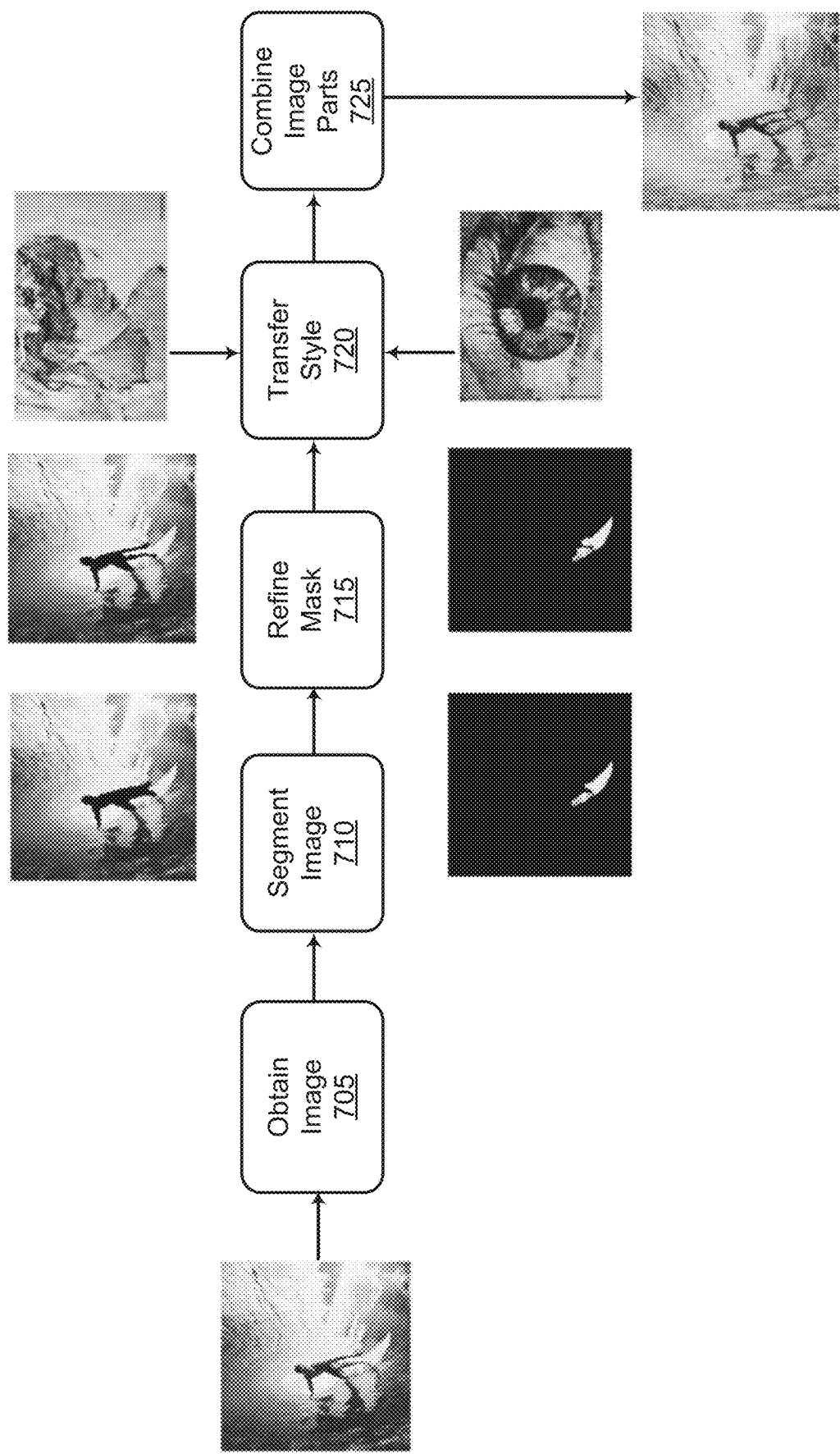
FIG. 7 shows an example of a method for generating a combined image according to aspects of the present disclosure.

FIG. 7 shows an example of a method for generating a combined image according to aspects of the present disclosure. Machine learning model 230 in FIG. 2 generates the combined image based on an input image and a style image. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system receives an image. In some cases, the operations of this step refer to, or may be performed by, a user interface as described with reference to FIG. 2. In an example, the image depicts a person surfing on a surfboard catching a large ocean wave that almost encapsulates the surfer. The surfing depicted in the image looks intense. In some cases, user 100 provides the image via an image upload element of user interface 220 as shown in FIG. 2.

At operation 710, the system performs image segmentation on the image. In some cases, the operations of this step refer to, or may be performed by, an image segmentation network as described with reference to FIGS. 2 and 3. In some embodiments, an image segmentation network (e.g., Mask R-CNN) extracts segmentation masks of the background and one or more objects in the image. In some cases, the image segmentation network may also be referred to as an object segmentation network. As an example shown in FIG. 7, the image segmentation network generates a segmentation mask for the background (above). The background may not include the person, which is identified as the foreground of the image. The image segmentation network generates a segmentation mask for the surfboard class object (bottom).

In some examples, the image segmentation network extracts masks related to class label "person" with certain dominance in terms of size (assuming person is the foreground here). The image segmentation network then inverts the values to obtain the segmentation mask for the background. However, embodiments of the present disclosure are not limited to segmenting person class as foreground. According to an embodiment, a foreground detector network or a segmentation model can choose the largest object in an image. The largest object (e.g., a person) may be identified as the foreground of the image. In some examples, user 100 can choose the foreground by selecting from different image segments of the image (e.g., a first segment, a second segment, etc.).

At operation 715, the system refines a segmentation mask to obtain a first segment. In some cases, the operations of this step refer to, or may be performed by, a refinement component as described with reference to FIGS. 2 and 3. In some cases, masks generated from the image segmentation network may not be that clean because the image segmentation network may be trained on different datasets. To obtain clean masks, the refinement component performs a segment refinement of the masks. In some examples, CascadePSP is used to refine the segmentation masks. In some examples, objects of the segments produced can be removed prior to style transfer or stylization. As an example shown in FIG. 7, the refinement component refines the segmentation mask for the background (above). The refinement component refines the segmentation mask for the surfboard class object (bottom).

At operation 720, the system applies style transfer to the first segment to obtain a first image part. In some cases, the operations of this step refer to, or may be performed by, a style transfer network as described with reference to FIGS. 2 and 3. According to an embodiment, the style transfer network performs style transfer on these mask images separately based on the style images selected by the user for the segmented regions. In some examples, the style transfer network includes a progressive attentional manifold alignment network (or PAMA).

PAMA is trained on Wikiart dataset. Accordingly, the style transfer network generates a more artistic style or feel for the regions that are stylized. It is aware of the semantic regions in images such that different objects in the image look different in terms of their style. As an example shown in FIG. 7, a first style image depicts a human face and is selected (above). The style of the first style image is transferred to the background of the image. A second style image depicts an eye region and is selected (bottom). The style of the second style image is transferred to the surfboard of the image. The objects in the image are preserved.

At operation 725, the system combines the first image part and a second image part to obtain a combined image. In some cases, the operations of this step refer to, or may be performed by, a composition component as described with reference to FIGS. 2 and 3. In some cases, the user may need to exclude an object from style transfer (i.e., the object is not part of the style transfer process). The user can go back a step, remove the object using the object segmentation network, pass it through the mask inpainting component 307 as shown in FIG. 3, and then execute style transfer.

The mask inpainting step is optional. According to an embodiment, the composition component overlaps the segmented images (i.e., a first image part, a second image part) together to obtain a combined image. As an example shown in FIG. 7, the combined image has the shape of objects as in the input image and the styles from the first style image and the second style image. The shape and style of the person is preserved.

Figure 8:
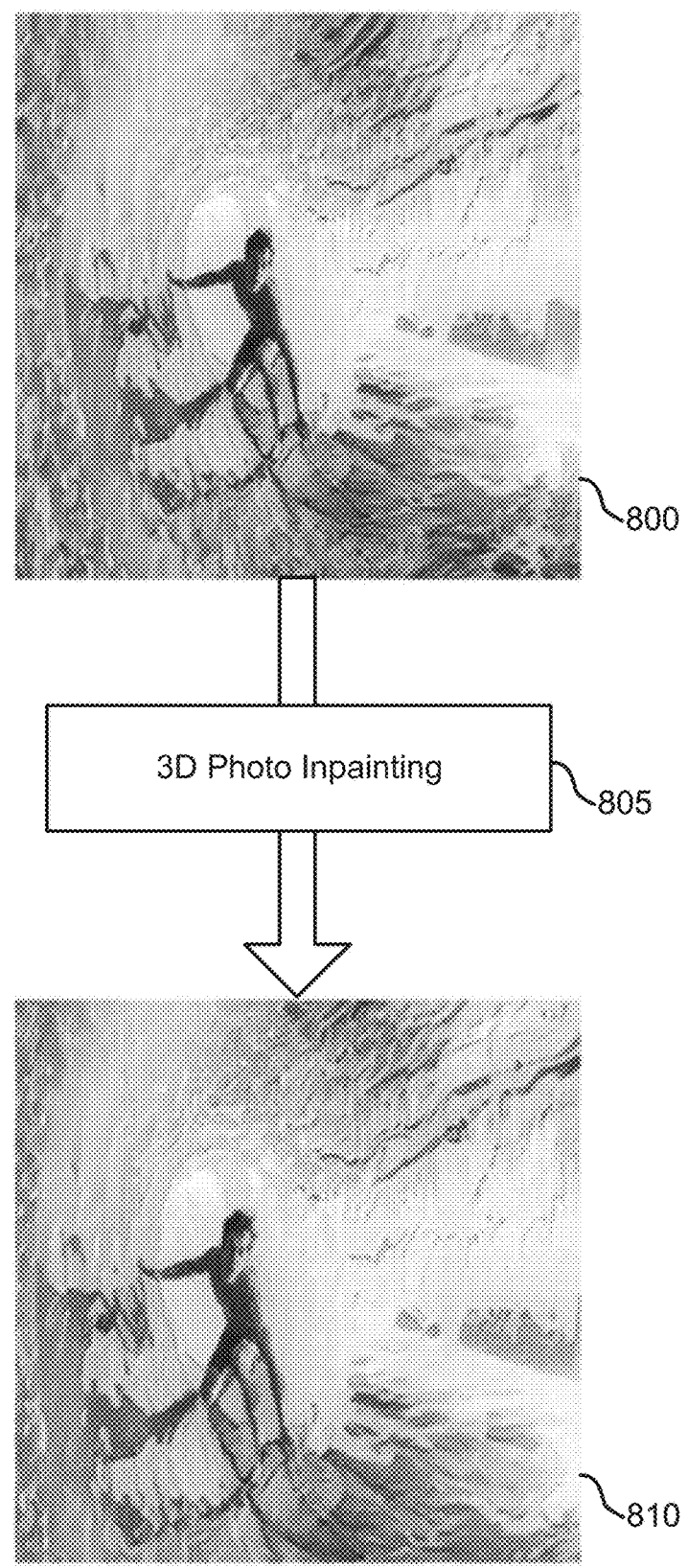
FIG. 8 shows an example of 3D lenticular depth illusion according to aspects of the present disclosure.

FIG. 8 shows an example of 3D lenticular depth illusion according to aspects of the present disclosure. Machine learning model 230 in FIG. 2 adds 3D lenticular depth illusion. The example shown includes combined image 800, lenticular effect 805, and output image 810. In some embodiments, machine learning model 230 can add lenticular effects 805 such as 3D photo inpainting to provide a sense of drama and impressiveness to the stylized image (e.g., combined image 800 generated from a style transfer network). This way, the user message is better delivered. Lenticular effects 805 involve creating depth illusion or changing the scene or mood of the image based on the angle at which users see the image. In some examples, machine learning model 230 converts a stylized image into a 3D video with these lenticular effects. In some cases, sliders are added for users to play with.

To create the depth effect, machine learning model 230, via 3D photo inpainting methods, takes a 2D image as input and creates a depth map for each pixel of the 2D image. Then, machine learning model 230 uses the RGB and the depth info to interpolate values to form a 3D mesh. Machine learning model 230 provides different motion effects such as zoom in, circular motion, swing motion, etc.

Combined image 800 is an example of, or includes aspects of, the corresponding element described with reference to FIGS. 5, 9, 11, and 12. Output image 810 is an example of, or includes aspects of, the corresponding element described with reference to FIGS. 5, 9, and 14.

Figure 9:
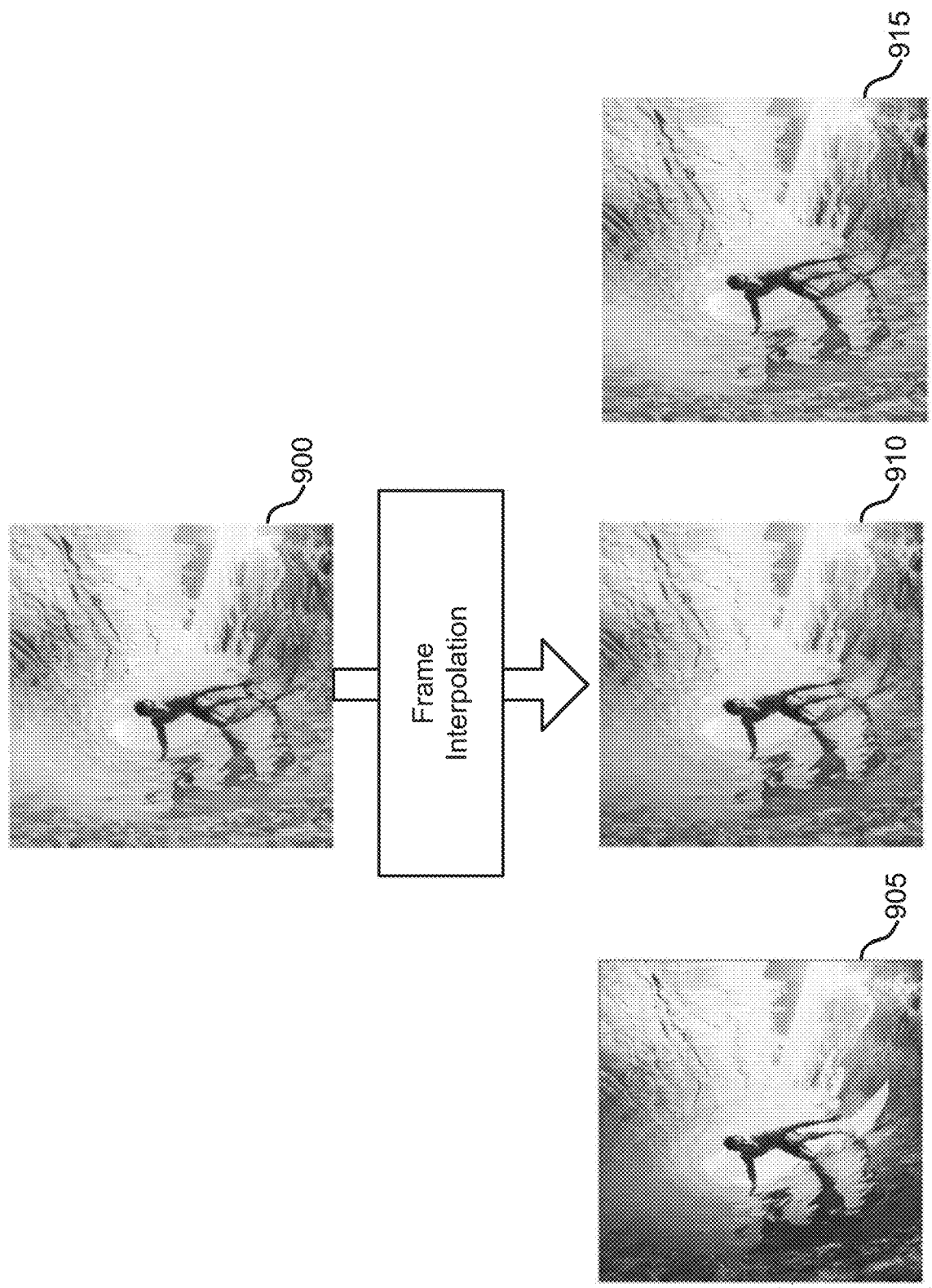
FIG. 9 shows an example of frame interpolation of a 3D lenticular effect according to aspects of the present disclosure.

FIG. 9 shows an example of frame interpolation of a 3D lenticular effect according to aspects of the present disclosure. Machine learning model 230 in FIG. 2 is configured to perform frame interpolation based on the combined image to obtain 3D lenticular effect. The example shown includes combined image 900, first intermediate image 905, second intermediate image 910, and third intermediate image 915.

Lenticular effects include a mood change effect. For mood change effect, machine learning model 230 transitions the two images i.e., the original image and stylized image (i.e., combined image 900) from full transparency to their original values in the opposite direction using their alpha values and then overlay the pixels. That is, first intermediate image 905, second intermediate image 910, and third intermediate image 915 are generated based on interpolation of the two images' transparency. In an example shown in FIG. 9, we see 3 intermediate frames from a GIF file we created after adding this effect. Combined image 900 is an example of, or includes aspects of, the corresponding element described with reference to FIGS. 3, 7, and 8.

Figure 10:
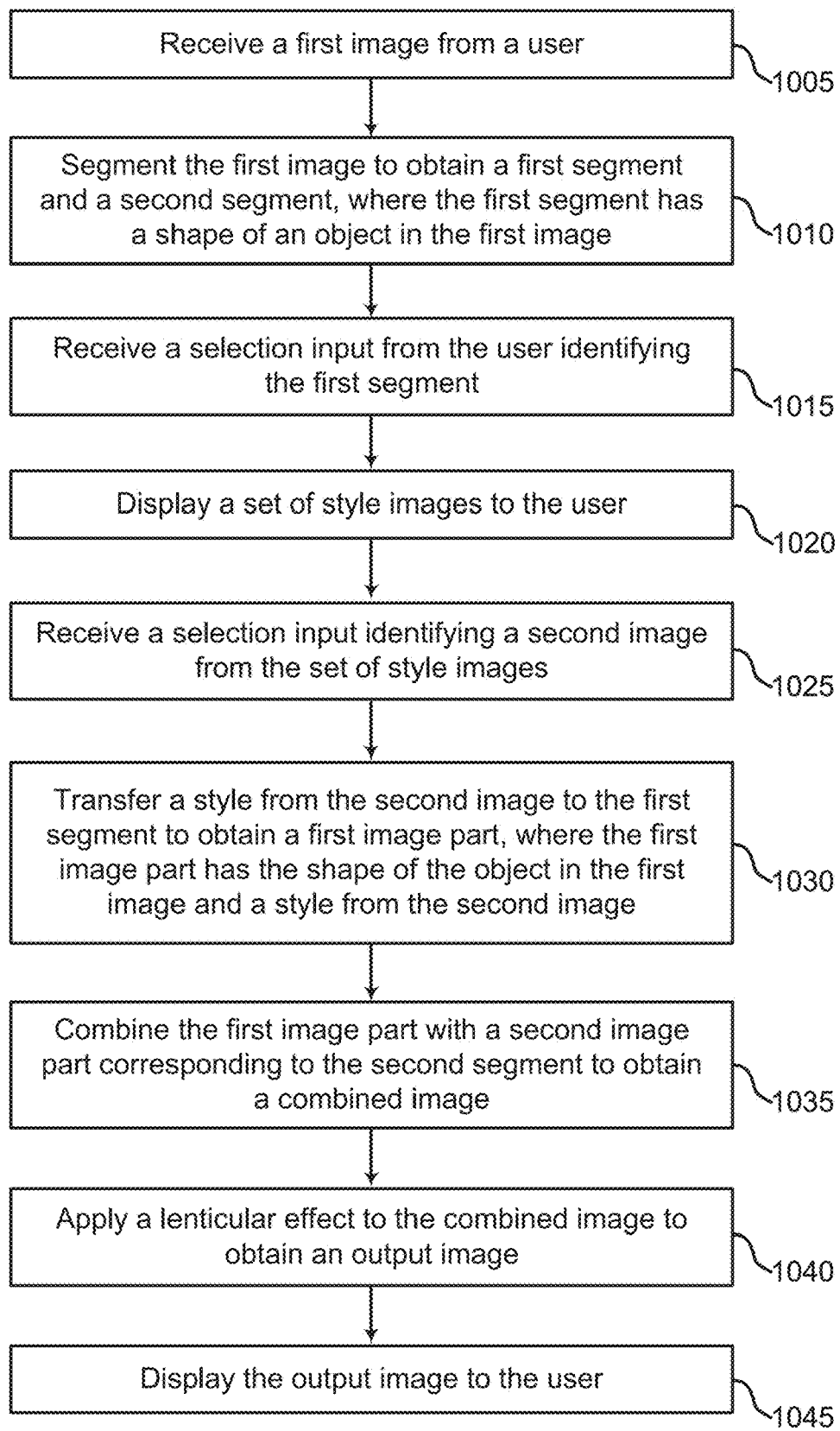
FIG. 10 shows an example of a method for image processing according to aspects of the present disclosure.

FIG. 10 shows an example of a method for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system receives a first image from a user. In some cases, the operations of this step refer to, or may be performed by, a user interface as described with reference to FIG. 2. As an example shown in FIGS. 11 to 14, the user uploads an image depicting a person standing on a mountain with an airplane passing by in the sky.

At operation 1010, the system segments the first image to obtain a first segment and a second segment, where the first segment has a shape of an object in the first image. In some cases, the operations of this step refer to, or may be performed by, an image segmentation network as described with reference to FIGS. 2 and 3. In some examples, the first segment of the image includes an object (e.g., an airplane).

At operation 1015, the system receives a selection input from the user identifying the first segment. In some cases, the operations of this step refer to, or may be performed by, a user interface as described with reference to FIG. 2.

At operation 1020, the system displays a set of style images to the user. In some cases, the operations of this step refer to, or may be performed by, a user interface as described with reference to FIG. 2. The user can select a style image from the set of style images to be applied to the first segment.

At operation 1025, the system receives a selection input identifying a second image from the set of style images. The selection input comes from a user via a user interface. In some cases, the operations of this step refer to, or may be performed by, a user interface as described with reference to FIG. 2. In some cases, the second image may be referred to as a style image.

At operation 1030, the system transfers a style from the second image to the first segment to obtain a first image part, where the first image part has the shape of the object in the first image and a style from the second image. In some cases, the operations of this step refer to, or may be performed by, a style transfer network as described with reference to FIGS. 2 and 3. Detail regarding applying style transfer via a user interface will be described in FIGS. 12 and 13.

At operation 1035, the system combines the first image part with a second image part corresponding to the second segment to obtain a combined image. In some cases, the operations of this step refer to, or may be performed by, a composition component as described with reference to FIGS. 2 and 3. In some examples, the second image part has the shape of an additional object of the first image and the style from an additional style image. That is, styles from different style images are transferred to different image parts of the same image.

At operation 1040, the system applies a lenticular effect to the combined image to obtain an output image. In some cases, the operations of this step refer to, or may be performed by, a post-processing component as described with reference to FIGS. 2 and 3. Detail regarding applying a lenticular effect to the combined image will be described in FIG. 14.

At operation 1045, the system displays the output image to the user. In some cases, the operations of this step refer to, or may be performed by, a user interface as described with reference to FIG. 2.

Figure 11:
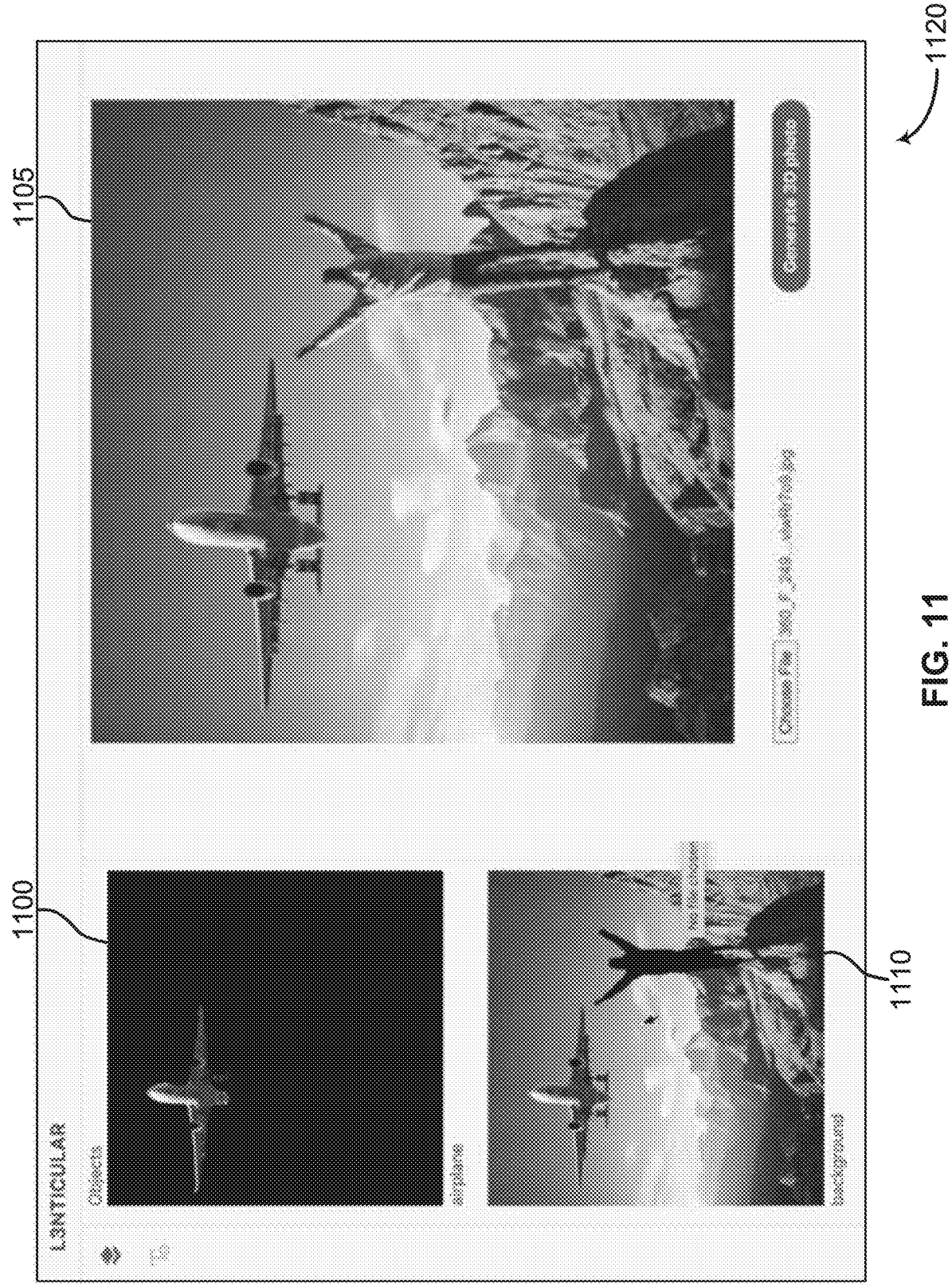
FIG. 11 shows an example of image segmentation according to aspects of the present disclosure.

FIG. 11 shows an example of image segmentation according to aspects of the present disclosure. User interface 220 of the machine learning model as shown in FIG. 2 is used to execute image segmentation based on user commands. The example shown includes first segment 1100, image 1105, second segment 1110, and user interface 1115. As an example user interface shown in FIG. 11, user 100 shown in FIG. 1 may want to create an immersive social media post of a vacation experience or create a stylized postcard having 3D motion effects. User 100 uploads image 1105 to user interface 1115. Once image 1105 is uploaded, image 1105 is input to machine learning model 230.

According to an embodiment, machine learning model 230 generates a set of segmentation masks (e.g., shown on the left of user interface 1115). Multiple objects are identified based on image 1105, for example, first segment 1100 includes an airplane and second segment 1110 depicts the background. User 100 may change the style of the segmentation masks independently by clicking on the mask thumbnails.

Image 1100 is an example of, or includes aspects of, the corresponding element described with reference to FIGS. 5 and 12. First segment 1100 is an example of, or includes aspects of, the corresponding element described with reference to FIG. 12. Second segment 1110 is an example of, or includes aspects of, the corresponding element described with reference to FIG. 13.

Figure 12:
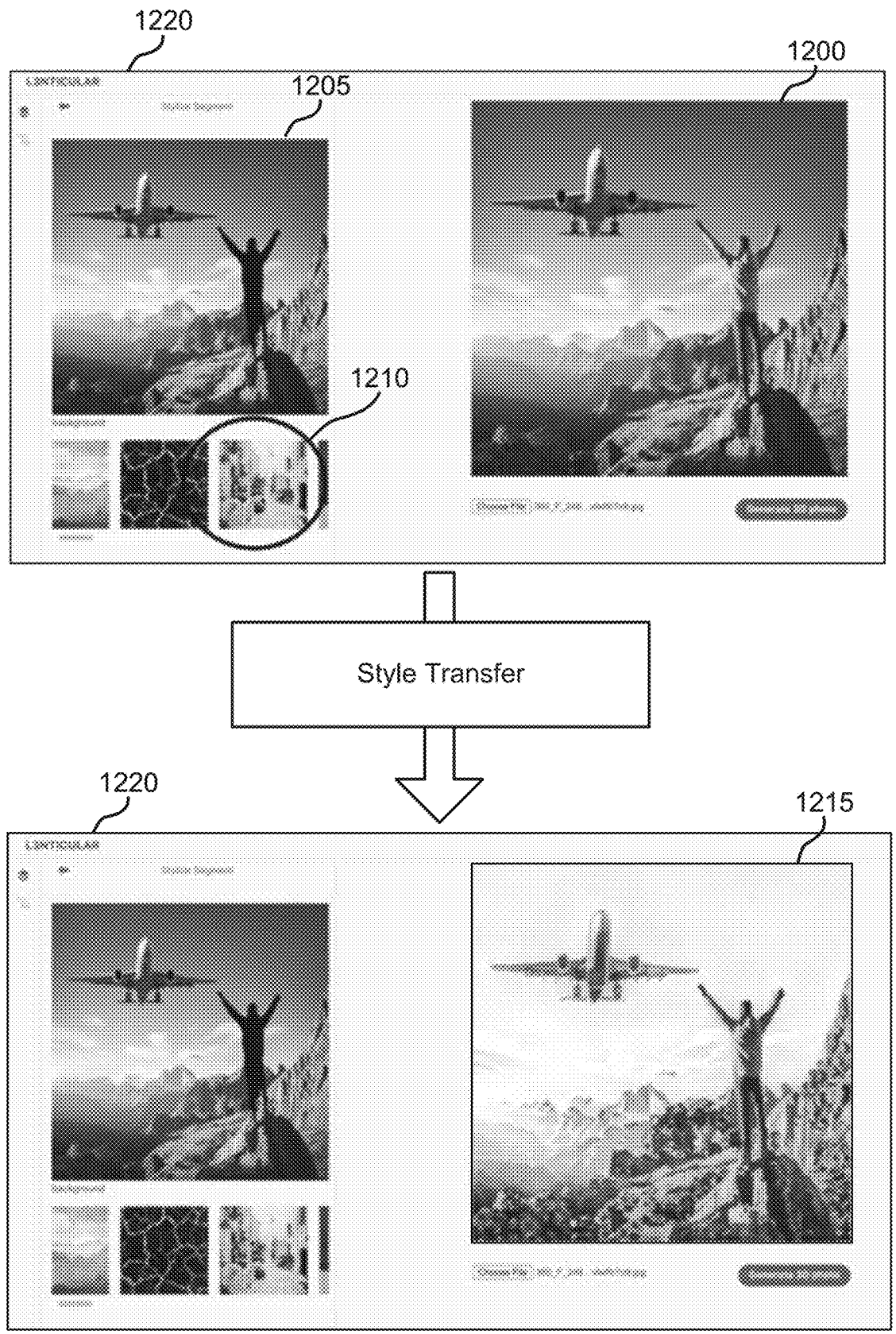
FIG. 12 shows an example of style transfer procedure according to aspects of the present disclosure.

FIG. 12 shows an example of style transfer procedure according to aspects of the present disclosure. User interface 220 of the machine learning model as shown in FIG. 2 is used to execute style transfer. The example shown includes image 1200, first segment 1205, style images 1210, first image part 1215, and user interface 1220. In some examples, first segment 1205 includes background of image 1200. In some examples, a user clicks on a segment of image 1200 the user wants to stylize. User interface 1220 provides a set of style images for the user to choose from. The user can visualize the stylized segment mask by clicking different style images. To do the same for other segmentation masks, the user clicks on the back arrow button on user interface 1220 and chooses a style for a segmentation mask by repeating the step.

Image 1200 is an example of, or includes aspects of, the corresponding element described with reference to FIGS. 5 and 11. First segment 1205 is an example of, or includes aspects of, the corresponding element described with reference to FIG. 11. Style images 1210 is an example of, or includes aspects of, the corresponding element described with reference to FIG. 13. Style image 1210 is an example of, or includes aspects of, the corresponding element described with reference to FIG. 13. First image part 1215 is an example of, or includes aspects of, the corresponding element described with reference to FIG. 13.

Figure 13:
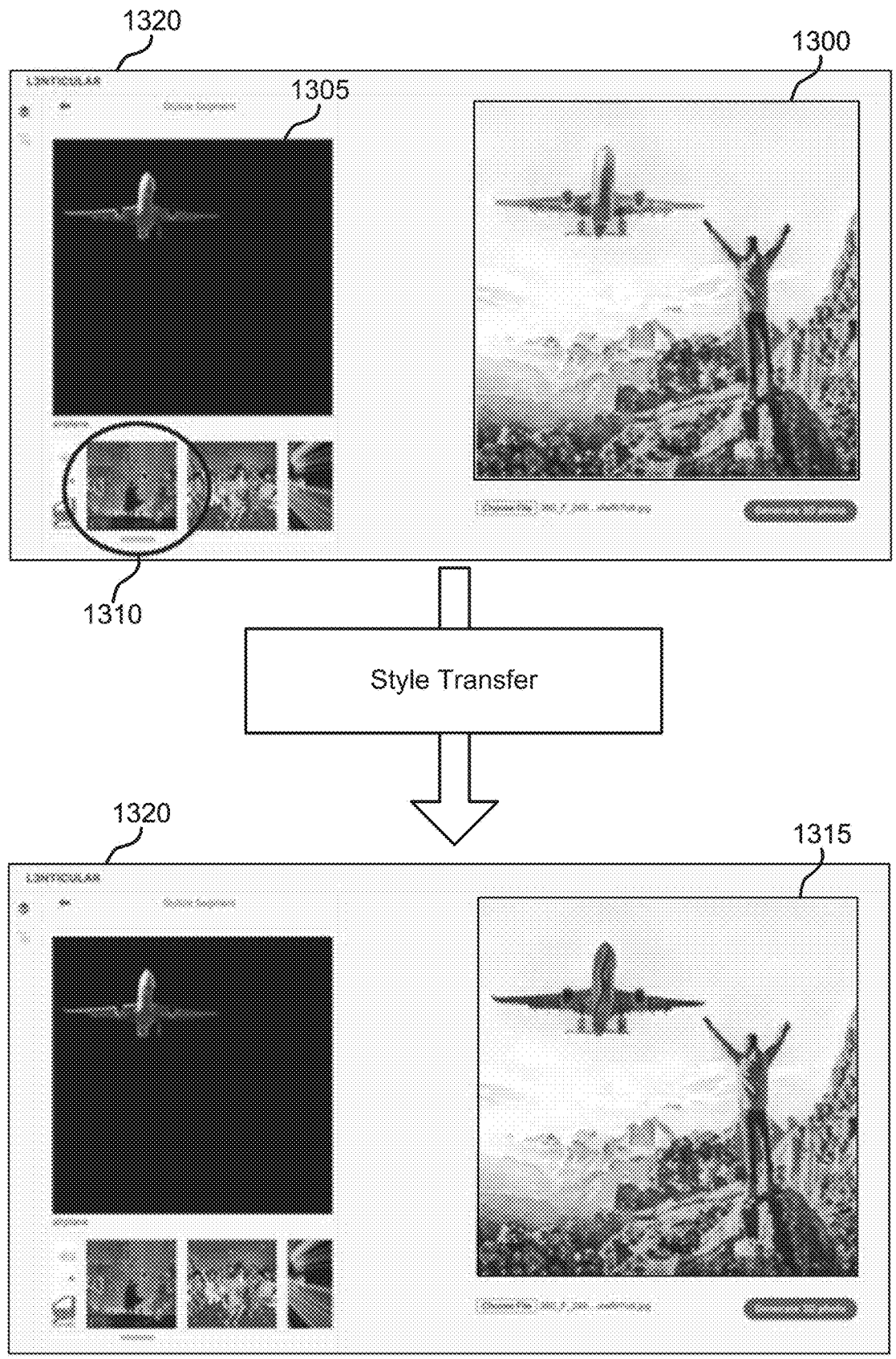
FIG. 13 shows an example of style transfer and composition procedure according to aspects of the present disclosure.

FIG. 13 shows an example of style transfer and composition procedure according to aspects of the present disclosure. User interface 220 of the machine learning model as shown in FIG. 2 is used to execute style transfer and composition. The example shown includes first image part 1300, second segment 1305, style image 1310, combined image 1315, and user interface 1320. In some examples, the user clicks on second segment 1305, which includes an airplane object. The user selects style image 1310 from a set of style images. Style image 1310 depicts a target style for the airplane object. User interface 1320, via a style transfer network, outputs a second image part based on the style image 1310 and second segment 1305. The second image part includes the target style and the airplane object. User interface 1320, via a composition component, combines first image part 1215 (see FIG. 12) with second image part corresponding to second segment 1305 to obtain combined image 1315.

First image part 1300 is an example of, or includes aspects of, the corresponding element described with reference to FIG. 12. Second segment 1305 is an example of, or includes aspects of, the corresponding element described with reference to FIG. 11. Style image 1310 is an example of, or includes aspects of, the corresponding element described with reference to FIG. 12. Combined image 1315 is an example of, or includes aspects of, the corresponding element described with reference to FIG. 14.

Figure 14:
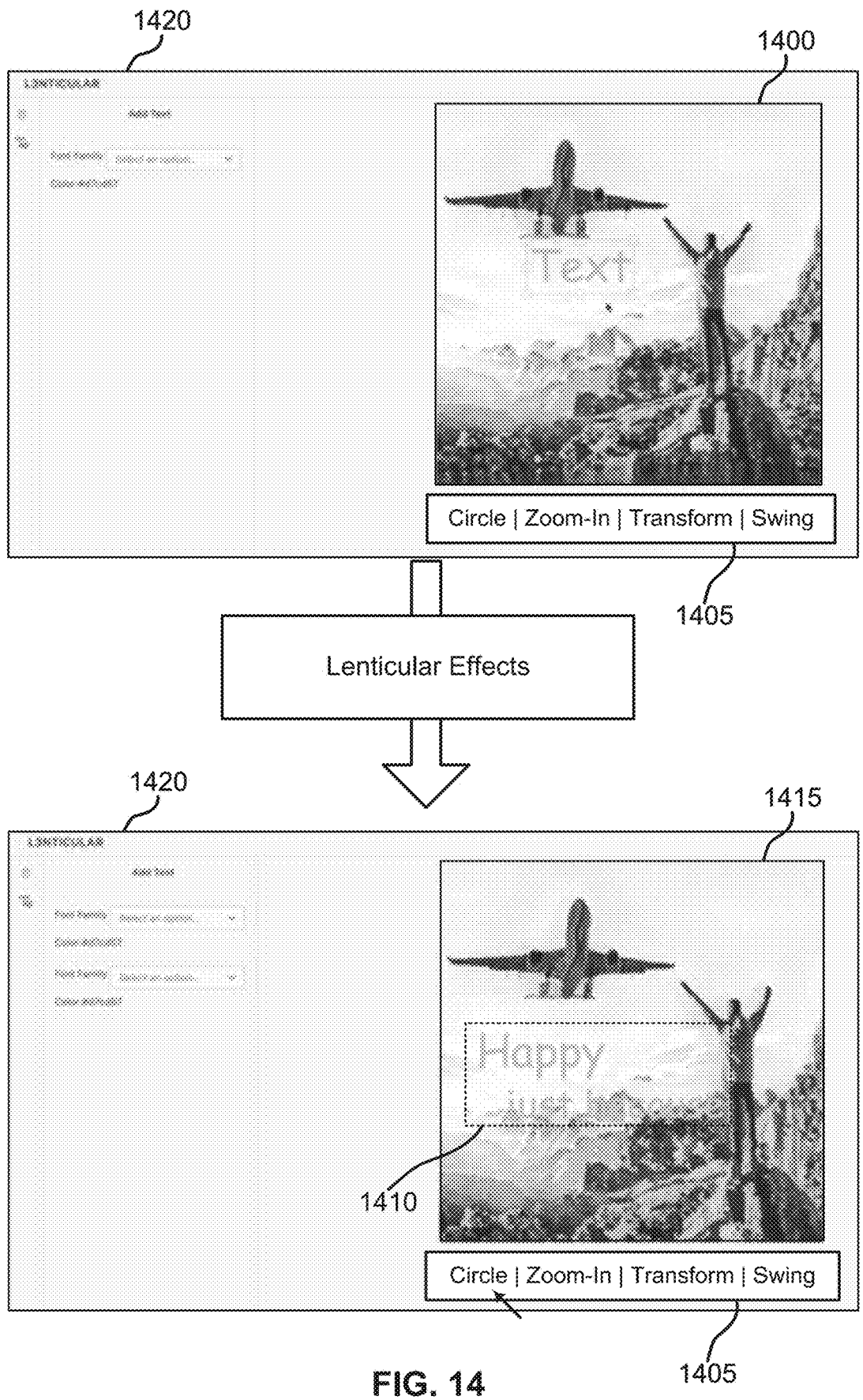
FIG. 14 shows an example of post-processing procedure according to aspects of the present disclosure.

FIG. 14 shows an example of post-processing procedure according to aspects of the present disclosure. User interface 220 of the machine learning model as shown in FIG. 2 is used to execute post-processing. The example shown includes combined image 1400, lenticular effects 1405, caption box 1410, output image 1415, and user interface 1420. When the user is satisfied with the changes, the user clicks on "Generate 3D photo" button. User interface 1420, via a post-processing component, outputs different video effects based on user input. That is, video effects depend on user clicks on the motion styles given such as circle, zoom-in, zoom-out, transform, swing, etc. Embodiments of the present disclosure are not limited to the listed motion styles. In some examples, the user adds text on combined image 1400 by clicking on "Add Text" button and the text may be placed anywhere in output image 1415. The user changes the font of the text according to user preference. The user downloads the creation (i.e., output image 1415). In some examples, output image 1415 is of JPEG (or JPG), TIFF, GIF, PNG, or raw image file format. In some cases, output image 1415 is a frame of a video in a format such as MP4, WMV, AVI, etc. Embodiments of the present disclosure are not limited to the aforementioned video formats. The user can then share output image 1415 on social media platforms.

In some embodiments, users can add text via caption box 1410, change font, and position caption box 1410 in the 3D postcard they create. Users can download and publish output image 1415 or output video to a social media platform in the form of JPEG, GIF, MPEG, etc. Combined image 1400 is an example of, or includes aspects of, the corresponding element described with reference to FIG. 13. Output image 1415 is an example of, or includes aspects of, the corresponding element described with reference to FIGS. 5 and 8.

Performance of apparatus, systems and methods of the present disclosure have been evaluated, and results indicate embodiments of the present disclosure have obtained increased performance over existing technology. Example experiments demonstrate that image processing apparatus 200 outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   receiving a first image depicting a scene and a second image that includes a style;
   segmenting the first image to obtain a first segment and a second segment, wherein the first segment has a shape of an object in the scene;
   applying a style transfer network to the first segment and the second image to obtain a first image part, wherein the first image part has the shape of the object and the style from the second image;
   combining the first image part with a second image part corresponding to the second segment to obtain a combined image; and
   applying a lenticular effect to the combined image to obtain an output image.

2. The method of claim 1, further comprising:
   receiving a third image including an additional style; and
   applying the style transfer network to the second segment and the third image to obtain the second image part, wherein the second image part includes the additional style.

3. The method of claim 1, further comprising:
   removing at least a portion of the first image based on the second segment; and
   performing inpainting on the second segment to obtain the second image part.

4. The method of claim 1, further comprising:
   generating a segmentation mask corresponding to the object; and
   refining the segmentation mask to obtain the first segment.

5. The method of claim 1, further comprising:
   performing a progressive attentional manifold alignment process on the first segment and the second image using the style transfer network, wherein the first image part is generated based on the progressive attentional manifold alignment process.

6. The method of claim 1, further comprising:
   generating a depth map of the combined image;
   generating a three-dimensional (3D) mesh based on the depth map; and
   generating a motion effect based on the 3D mesh, wherein the lenticular effect comprises the motion effect.

7. The method of claim 6, wherein:
   the motion effect comprises a zoom motion, a circular motion, a swing motion, or any combination thereof.

8. The method of claim 1, further comprising:
generating a first transparency parameter for the first image and a second transparency parameter for the combined image; and
generating one or more intermediate images by modifying the first transparency parameter and the second transparency parameter, wherein the output image includes the one or more intermediate images.

9. The method of claim 1, further comprising:
providing an image upload element in a user interface, wherein the first image is received via the image upload element.

10. The method of claim 1, further comprising:
receiving caption text from a user input; and
adding the caption text to the output image.

11. A method comprising:
receiving a first image from a user;
segmenting the first image to obtain a first segment and a second segment, wherein the first segment has a shape of an object in the first image;
receiving a first selection input from the user identifying the first segment;
displaying a plurality of style images to the user;
receiving a second selection input identifying a second image from the plurality of style images;
transferring a style from the second image to the first segment to obtain a first image part, wherein the first image part has the shape of the object in the first image and the style from the second image;
combining the first image part with a second image part corresponding to the second segment to obtain a combined image;
applying a lenticular effect to the combined image to obtain an output image; and
displaying the output image to the user.

12. The method of claim 11, further comprising:
identifying the first segment or the second segment as a foreground element; and
displaying an indication of the foreground element to the user.

13. The method of claim 11, further comprising:
receiving a third selection input identifying a third image from the plurality of style images; and
transferring an additional style from the third image to the second segment to obtain the second image part.

14. The method of claim 11, further comprising:
receiving caption text from the user; and
adding the caption text to the output image.

15. An apparatus comprising:
an image segmentation network configured to segment a first image to obtain a first segment and a second segment, wherein the first segment has a shape of an object in the first image;
a style transfer network configured to generate a first image part based on the first segment and a second image, wherein the first image part has the shape of the object and a style from the second image;
a composition component configured to combine the first image part with a second image part corresponding to the second segment to obtain a combined image; and
a post-processing component configured to apply a lenticular effect to the combined image to obtain an output image.

16. The apparatus of claim 15, further comprising:
a user interface including an image upload element, a segment selection element, and a style selection element.

17. The apparatus of claim 15, further comprising:
a refinement component configured to refine a segmentation mask to obtain the first segment.

18. The apparatus of claim 15, wherein:
the image segmentation network includes Mask R-CNN.

19. The apparatus of claim 15, wherein:
the image segmentation network includes a foreground detector network.

20. The apparatus of claim 15, wherein:
the style transfer network includes a progressive attentional manifold alignment network.

* * * * *